Aug. 22, 1939.  J. J. McCARTHY  2,170,151
INTERNAL COMBUSTION ENGINE
Filed Nov. 13, 1937   3 Sheets-Sheet 2

Inventor:
John J. McCarthy
By Dike, Calver & Gray
Attorneys.

Aug. 22, 1939.    J. J. McCARTHY    2,170,151
INTERNAL COMBUSTION ENGINE
Filed Nov. 13, 1937    3 Sheets-Sheet 3

Inventor:
John J. McCarthy
By Dike, Calver & Gray
Attorneys.

Patented Aug. 22, 1939

2,170,151

UNITED STATES PATENT OFFICE 2,170,151

INTERNAL COMBUSTION ENGINE

John J. McCarthy, Malden, Mass.

Application November 13, 1937, Serial No. 174,412

4 Claims. (Cl. 123—55)

This invention relates to internal combustion engines, and more particularly, though not exclusively, to engines of the Diesel or compression-ignition type.

It is the primary aim and object of the present invention to provide a two-cycle engine in which a cylinder requires only one valve for intake and exhaust which is, moreover, operated by the crank shaft.

It is another object of the present invention to provide a two-cycle engine of the solid-injection type in which said single valve causes straight-through scavenging of the cylinder and also admits the combustion air therein.

It is another object of the present invention to provide for an adjustable lead of the piston in the cylinder over said valve so as to obtain variable degrees of opening of the exhaust ports prior to the opening of the intake ports and, conversely, variable degrees of closing of the intake ports after the exhaust ports are completely closed.

It is another object of the present invention to provide an engine of the solid-injection type in which a very high, directed turbulence of the combustion air and of the fuel charge in a cylinder is created so as to obtain a quick and very fine atomization of the fuel and, consequently a quick and complete combustion of the same without any after-burning effects.

It is another object of the present invention to provide an engine having a plurality of radially disposed cylinders, a single valve for each cylinder to control the intake of the scavenging fluid and of the combustion air as well as the exhaust of the products of combustion, and a single crank on the crank shaft of the engine for operating all valves.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 2:
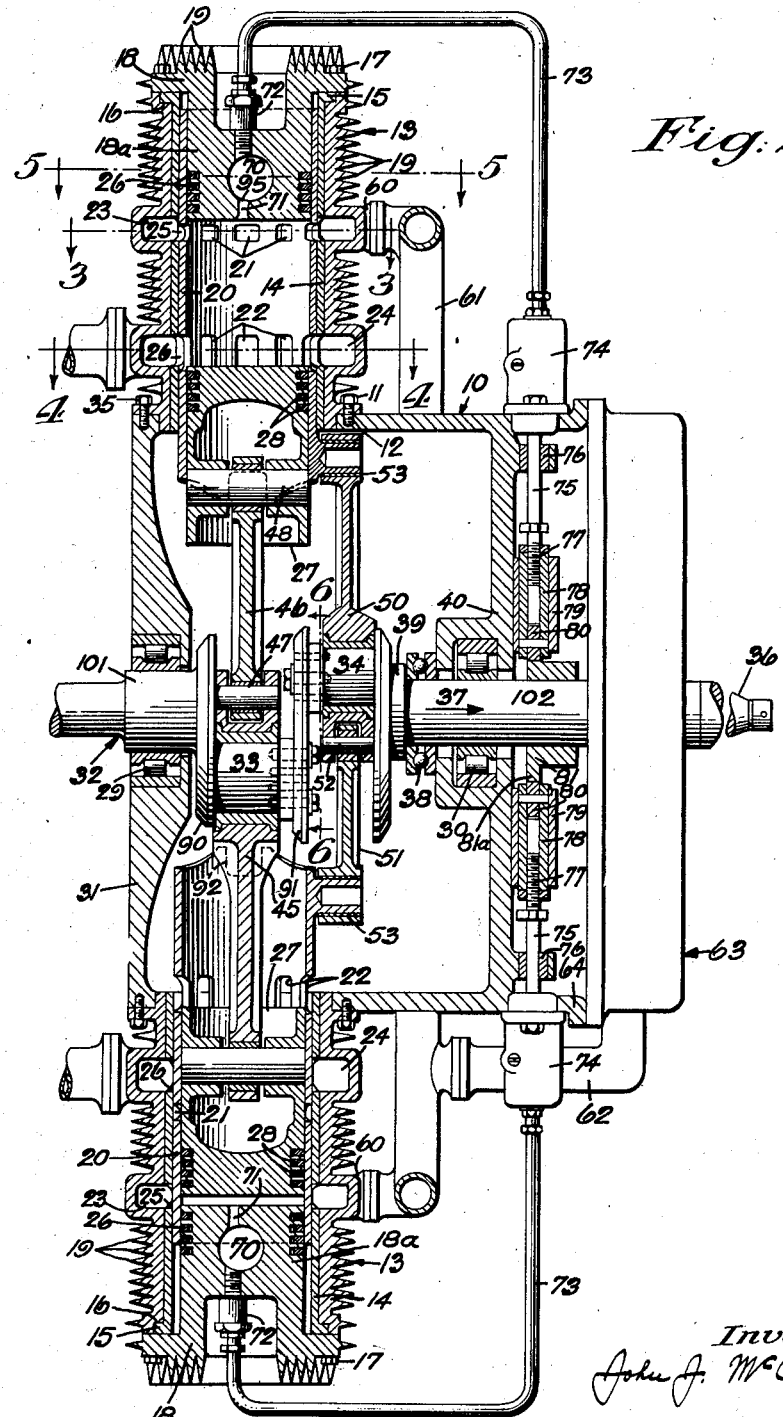
Fig. 2 is a section through the engine taken substantially along the line 2—2 of Fig. 1.
Figure 3:
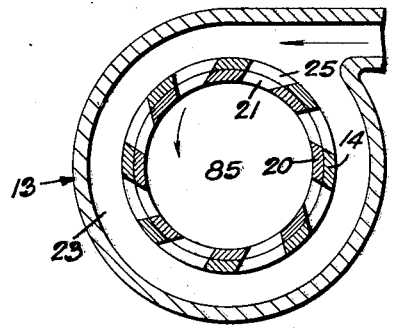
Figure 4:
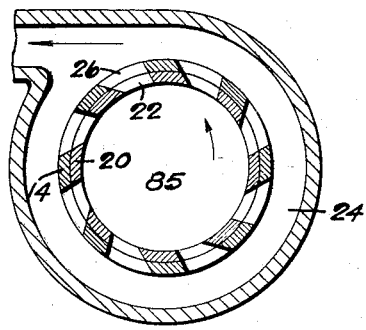

Figs. 3 and 4 are enlarged fragmentary sections, taken on the lines 3—3 and 4—4, respectively, of Fig. 2.

Figure 5:
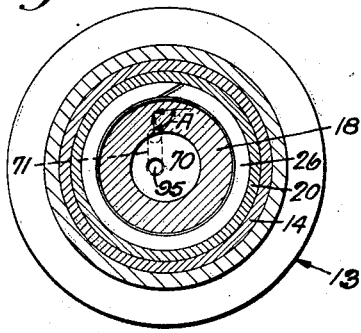

Fig. 5 is an enlarged section, taken on the line 5—5 of Fig. 2.

Figure 6:
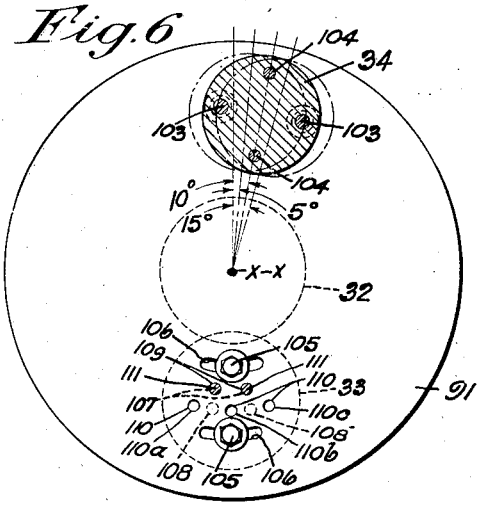

Fig. 6 is an enlarged section taken on the line 6—6 of Fig. 2.

Figure 7:
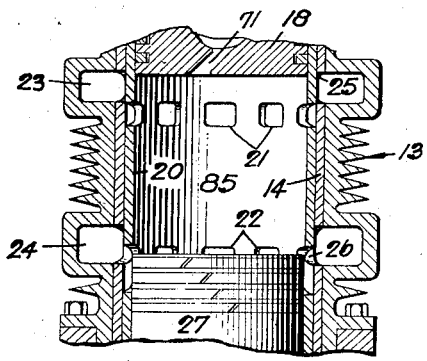
Figure 8:
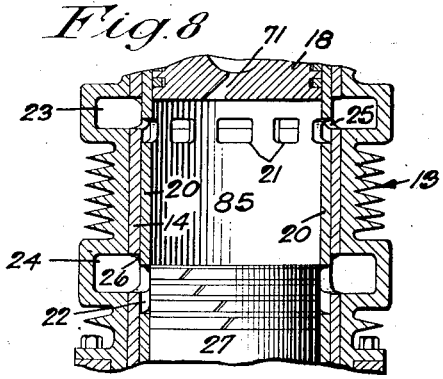

Figs. 7 and 8 are enlarged, fragmentary sections of one cylinder of the engine, depicting the characteristic results of a selected lead of the piston over the valve.

Figure 1:
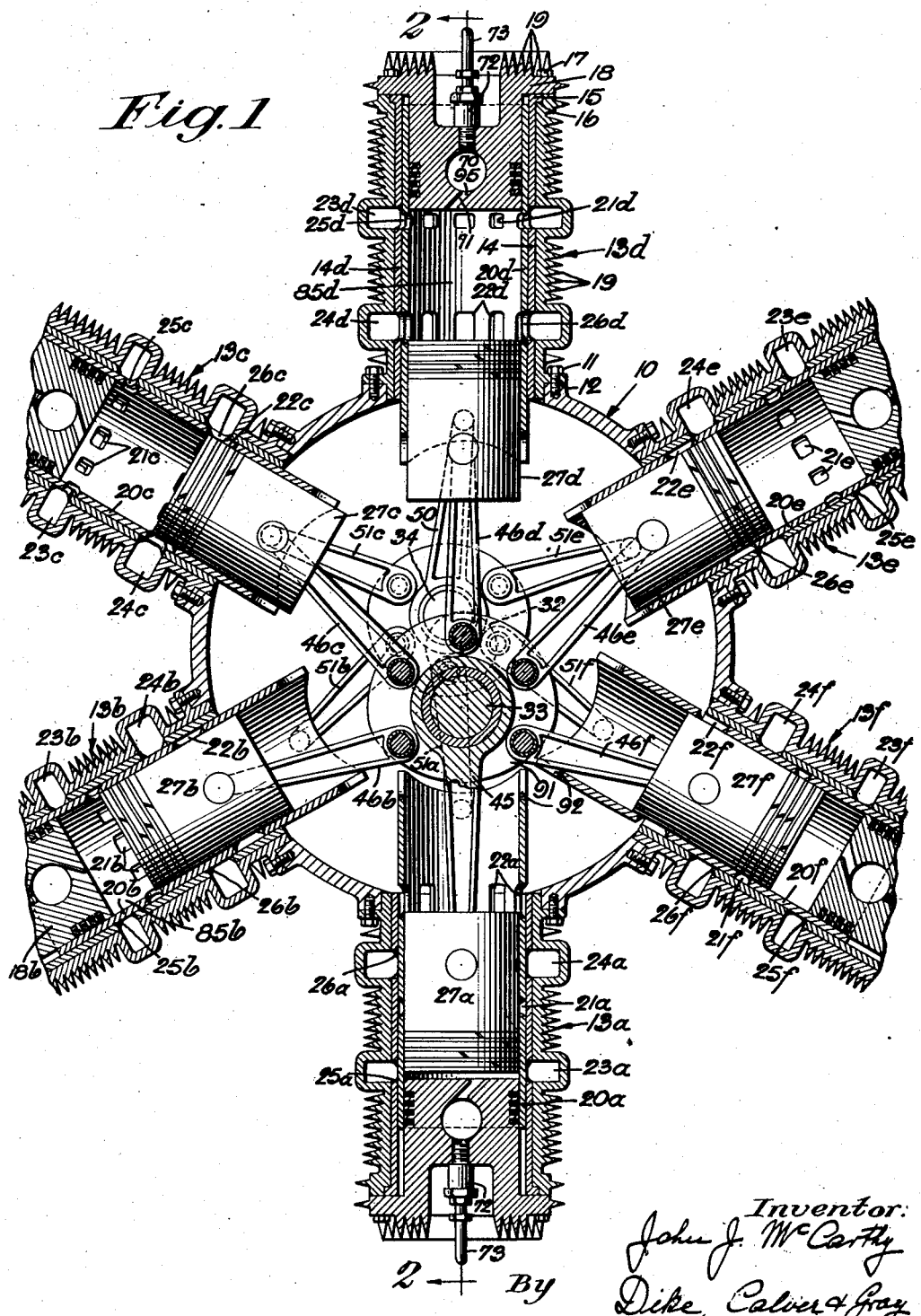
Fig. 1 is a cross-section through an internal combustion engine embodying the present invention.

Referring to the drawings and more particularly to Figs. 1 and 2 thereof, the reference numeral 10 designates a crank case which is preferably cast of aluminum or a similar light weight material. Suitably mounted at 11 on machined surfaces 12 of the crank case are a plurality of equiangularly spaced cylinders 13. By way of example, the drawings show six cylinders, but it is to be understood that any other number of cylinders may be employed without departing from the present invention.

The cylinders 13 are, like the crank case, preferably, cast of aluminum or a similar lightweight material and provided with steel liners 14, having annular flanges 15 disposed in annular recesses 16 of the cylinders. Suitably mounted by screws 17 on the outer ends of the cylinders are cylinder heads 18 which also retain the flanges 15 of the liners 14 in their recesses 16. More particularly, the screws 17 are received in tapped holes which are formed partly in the cylinders 13 and partly in the flanges 15 of the liners 14, thus locking the latter against rotation relative to the cylinders. The cylinders 13 as well as the heads 18 are preferably provided with integral cooling ribs 19 for air-cooling the cylinders. Of course, the cylinders may be water-cooled if desired, in which case the same would have to be provided with water jackets. For air craft purposes, however, the much simpler air-cooling of the cylinders is perfectly satisfactory.

Slidable longitudinally in each cylinder 13 is a sleeve valve 20, having a plurality of peripheral intake ports 21 and a plurality of peripheral exhaust ports 22 which are spaced longitudinally from said intake ports. These intake and exhaust ports 21 and 22, respectively, are adapted to cooperate with circular manifolds 23 and 24, respectively, of the cylinders 13. The liners 14 are provided with ports 25 and 26 which are in permanent communication with the manifolds 23 and 24, respectively, of the cylinders 13 and in longitudinal alinement with the intake and exhaust ports 21 and 22, respectively, of the valves 20.

The cylinder heads 18 are provided with cylindrical portions 18a which extend considerably into the cylinders 13 and are spaced from the liners 14 to admit the sleeve valves 20 therebetween. In order to prevent any leakage past the highly compressed combustion charge past the cylinder heads, the same are provided with compression rings 26 on which the valves 20 slide.

Reciprocable in each sleeve valve 20 is a single-acting piston 27, having the usual compression and oil rings 28.

Mounted in suitable journal bearings 29 and 30 in an end cover 31 and in the crank case 10, respectively, is a crank shaft 32 which provides two offset cranks 33 and 34. The end cover 31 is suitably mounted at 35 on the open end of the crank case 10. If the present engine is used for air craft, the crankshaft 32 is also the propeller shaft, the propeller (not shown) then being mounted on the forward end 36 of said shaft in any conventional manner. A thus mounted propeller creates a considerable thrust in the crank or propeller shaft 32 in the direction of the arrow 37 in Fig. 2, requiring a thrust bearing 38 which is interposed between a collar 39 of said shaft and an end wall 40 of the crank case 10.

Rotatably mounted on the crank 33 of the crank shaft is a "master" connecting rod 45 of conventional design with which the other connecting rods 46 are pivotally connected as at 47 in Fig. 2. These connecting rods 45 and 46 are also pivotally connected with the wrist pins 48 of the pistons 27.

Likewise, the other crank 34 of the crank shaft has rotatably mounted thereon a "master" connecting rod 50 to which other connecting rods 51 are pivotally connected as at 52. The connecting rods 50 and 51 are also pivotally connected at 53 with the sleeve valves 20.

The intake manifolds 23 of the cylinders 13 are provided with inlets 60 which are in permanent communication with a circular main manifold 61 that is in turn in permanent communication with a branch conduit 62 of an air compressor 63 which is mounted in any suitable manner on a flange 64 of the crank case 10. This air compressor is preferably a conventional turbo-supercharger, consisting of a centrifugal compressor which is direct-driven by an exhaust gas turbine. Inasmuch as the construction and operation of the supercharger does not form any part of the present invention, it is deemed unnecessary to describe the same in detail.

The exhaust manifolds 24 of the cylinders 13 are also preferably in communication with a circular main manifold (not shown).

The cylinder heads 18 are provided with pre-combustion chambers 70 which are in communication with the interior of the cylinders 13 through ducts 71. Mounted in the cylinder heads 18 for fuel injection into the pre-combustion chambers 70 and cylinders 13 are fuel nozzles 72 of any conventional construction. These nozzles 72 act preferably like check valves that will open in one direction only, to wit, in the direction of the fuel injection. Each fuel nozzle 72 permanently communicates through a conduit 73 with a fuel pump 74 which is suitably mounted on the crank case 10. The fuel pumps 74 are preferably plunger pumps which put a metered amount of fuel periodically under a much higher pressure than that of the combustion air in the cylinders at the time of the fuel injection. The plungers 75 of the fuel pumps 74, which are guided for linear movement in bushings 76 in the crank case 10, have their lower ends lengthwise adjustably secured at 77 to sleeves 78 which are also guided for linear movement in suitable guides 79, provided by the end wall 40 of the crank case. Each sleeve 78 carries an anti-friction roller 80 which cooperates with a cam disk 81, suitably mounted on the crank shaft 32. The various fuel pumps 74 are supplied with fuel from any suitable supply tank (not shown) by means of any conventional low pressure fuel pump (not shown) and suitable conduits (not shown). The cam disc has a single lobe 81a which actuates the plungers 75 of consecutive fuel pumps 74.

The lubrication of the movable elements of the engine may be accomplished in any suitable manner. Forced lubrication by means of an oil pump (not shown) is however, preferred to any other kind of lubrication. Inasmuch as the lubrication of the engine does not form any part of the present invention, no further comment concerning the same is deemed necessary.

In operation, the firing of the cylinders takes place in consecutive order as is usual in engines of the Diesel or compression-ignition type. In Fig. 1, the cylinder 13a has just fired a few degrees before the piston 27a has reached the illustrated, outer dead center position. On continued rotation of the crank shaft 32 from the angular position shown in Fig. 1 in assumed clockwise direction, the piston 27a starts its combustion stroke, i. e., is moved inwardly toward the center of the crank case 10, whereby the "master" rod 45 imparts a considerable clockwise torque to the crank shaft, as can be readily understood.

The cylinder 13b in Fig. 1 is next to fire. The piston 27b is presently on its compression stroke, i. e., moves outwardly toward the cylinder head 18b and compresses the previously admitted combustion air in the cylinder chamber 85b which is defined by the sleeve valve 20b, the cylinder head 18b and the piston 27b.

The cylinder 13c in Fig. 1 will fire after the cylinder 13b. The piston 27c is already on its compression stroke. It will be observed that the exhaust ports 22c and 26c are nearly closed, while the intake ports 21c and 25c are still considerably open. On slight further rotation of the crank shaft 32, the piston 27c and the valve 20c, moving in opposite directions, will cooperate to close the exhaust ports considerably before the valve 20c closes the intake ports (see also Fig. 8). By closing the exhaust ports prior to the intake ports, the combustion air, which is admitted after the closing of the exhaust ports, is free from any products of combustion.

The cylinder 13d in Fig. 1 will fire after the cylinder 13c. The piston 27d is in its inner dead center position and the valve 20d has almost reached outer dead center position in which its intake and exhaust ports 21d and 22d, respectively, are in full communication with the intake and exhaust ports 25d and 26d, respectively, of the cylinder liner 14d. Compressed air from the continuously operating supercharger 63 is thus admitted to the cylinder chamber 85d and causes a straight-through scavenging of the cylinder 13d.

The cylinder 13e will fire after the cylinder 13d. The piston 27e is near the end of its combustion stroke as is evidenced by the fact that the exhaust ports 26e in the liner 14e will shortly communicate with the exhaust ports 22e of the valve 20e, which is on its way to outer dead center position.

The cylinder 13f will fire after the cylinder 13e. More particularly, the piston 27f has just started on a combustion stroke and imparts a considerable torque to the crank shaft 32.

The sleeve valves 20 have been made of considerable length so as to provide as much guiding surface as possible for the pistons 27, particularly when they assume inner dead center position as shown at 27d in Fig. 1. In order to avoid any interference between the cheeks 90 and 91 of the crank shaft 32 and the reciprocating valves 20, the near ends of the latter are curved in the fashion shown in Figs. 1 and 2. The valves 20 are furthermore provided with diametrically opposite slots 92 to avoid interference between said valves and the connecting rods 46 when the latter assume the position 46f in Fig. 1, for instance.

Referring more particularly to Fig. 3, it will be observed that the intake ports 21 and 25 of the valve 20 and the liner 14, respectively, of a cylinder 13 are so arranged as to admit the compressed air from the intake manifold 23 of said cylinder substantially tangentially into the cylinder chamber 85. Moreover, in order to obtain a substantially uniform flow of compressed air through all intake ports 25 and 21, the air is conducted from the main manifold 61 (Fig. 2) into the circular manifold 23 of the cylinder in the tangential fashion shown in Fig. 3. The substantially tangential admission of the compressed air into the cylinder chamber 85 causes the admitted air to whirl in a counter-clockwise direction as viewed in Fig. 3. Fig. 4, on the other hand, shows that the exhaust ports 22 and 26 of the valve 20 and the liner 14, respectively, are so arranged as to permit a substantially tangential discharge of the products of combustion from the cylinder chamber 85 into the circular cylinder manifold 24 in the same direction in which the compressed air enters said cylinder chamber through the intake ports 25, 21. Hence, the admitted, whirling compressed air in the cylinder chamber 85 starts to whirl the products of combustion in the same direction and, in a sense, whirls the same from said cylinder chamber into the exhaust manifold 24 of the cylinder without meeting any appreciable resistance. A very thorough, straight-through scavenging of the cylinder chamber 85 is thus assured. Also the whirling combustion air, which is admitted to the cylinder chamber 85 while the intake ports 25, 21 are still open and the exhaust ports are already closed (see Fig. 8), is sufficiently turbulent to bring about a thorough mixing of said air with the injected fuel charge.

In the present instance, the fuel charges for the various cylinders are injected into the pre-combustion chambers 70 of the cylinder heads 18 by the nozzles 72 and the fuel pumps 74. More particularly, the entrance 95 to each duct 71 between a pre-combustion chamber 70 and a cylinder chamber 85 is in alinement with its fuel nozzle 72 as appears from Figs. 1 and 2, wherefore a fuel jet issuing from said nozzle is directed into said entrance 95. It appears also from Figs. 1, 2 and 5 that the ducts are straight, inclined and otherwise disposed in a well intended manner for a reason which will be presently explained. The entrance 95 to each duct 71 is eccentrically located with respect to the center axis of a cylinder as appears best from Fig. 5. Hence, each duct 71 is so disposed that fuel conducted therethrough meets the whirling combustion air in a cylinder chamber 85 at an angle A of more than 90 degrees (Fig. 5), with the result that the admitted fuel tends to repulse the whirling air and becomes, therefore, very quickly and thoroughly atomized for an immediate and complete combustion which starts in the pre-combustion chamber for well known reasons and is immediately transmitted to the charge in the combustion chamber of the cylinder. Of course, the whirl of the combustion air will persist near the end of the compression stroke of a piston when the fuel injection starts, making the above explained, quick atomization of the fuel charge possible.

It is customary to give the piston 27 a lead of a few degrees over the valves 20. This is accomplished by disposing the cranks 33, 34 of the crank shaft 32 in the offset manner as best shown in Fig. 1. By letting the pistons lead the valves in this fashion, the exhaust ports 22, 26 in each cylinder will open prior to the intake ports 25 and 21, and said exhaust ports will close prior to said intake ports.

Prior opening of the exhaust ports results in the discharge of most of the considerably compressed products of combustion from the cylinder chambers into the exhaust manifolds in which substantially atmospheric pressure prevails, without requiring the aid of compressed air from the supercharger. When the intake ports finally open, the remaining products of combustion are quickly forced from the cylinder chambers into the exhaust manifolds and the admitted compressed air will thoroughly scavenge said cylinder chambers. Fig. 7 illustrates the degree of opening of the exhaust ports prior to the opening of the intake ports for the offset position of the cranks 33, 34 as shown in Fig. 1. It will be observed in Fig. 7 that the intake ports 25, 21 are still closed, while the exhaust ports 22, 26 are already partially uncovered by the piston 27.

Closing of the exhaust ports prior to the intake ports assures a complete separation of the products of combustion from the combustion air, though the scavenging air and the combustion air is delivered during a single, continuous admission into the cylinder chambers. Hence, the combustion air is pure and not contaminated with any products of combustion which would cause undesired after-burning effects. Fig. 8 illustrates the condition, prevailing as a result of the offset position of the cranks 33, 34 as shown in Fig. 1, in which the intake ports 25, 21 are still partially open while the exhaust ports 22, 26 have just been closed by the cooperation between the sleeve valve 20 which moves into its inner dead center position and the piston 27 which is on its compression stroke. That air which is admitted through the partially open intake ports 25, 21 to the cylinder chamber after the exhaust ports 22, 26 are closed is the combustion air proper which will atomize the later injected fuel charge and render the same combustible.

It will be appreciated from the foregoing, and it is generally known by those skilled in the art, that a lead of the pistons over the sleeve valves makes for a very economical consumption of compressed air and, hence, permits the installation of a supercharger of comparatively small capacity which is not bulky and is of comparatively light weight. This is of particular importance if the engine is used in air planes and the supercharger has to compress the rarefied air in higher altitudes.

It is, therefore, obvious that the exhaust ports may open considerably before the intake ports if the engine is used in higher altitudes where the atmospheric pressure is considerably lower than near sea level. In that case, the pressure differential between the products of combustion and the atmosphere is so great that the former discharge quickly into the exhaust manifolds, thus requiring a minimum amount of scavenging air for a very short period of time only.

In order to use the present engine most efficiently in zones anywhere between sea level and high altitudes, hence not for air craft purposes exclusively, it stands to reason that one and the same standard production engine would require different crank shafts in order to obtain that lead of the pistons over the valves which is most favorable for prevailing atmospheric conditions. In order to enable a manufacturer to produce one standard production type of engine with one standard production type of crank shaft without limiting the most efficient operation of the engine to a certain atmospheric condition, the present crank shaft 32 is adjustable so that the lead of the pistons over the valves may be changed to suit prevailing atmospheric conditions. This is accomplished by making the crank shaft 32 of two parts 101 and 102. The shaft part 101 is integral with the crank 33, while the shaft part 102 is integral with the crank 34. Interposed between the cranks 33 and 34 is the cheek 91 which is a separate part and secured to the cranks 33, 34 in the following manner.

Referring more particularly to Fig. 6, the cheek 91, shown as being in the preferred form of a disc, is bolted at 103 to the crank 34. A plurality of dowel pins 104 are also provided to prevent shearing of the bolts 103. The cheek 91 is also secured to the crank 33 by means of screws 105 which extend through slots 106 concentric to the crank shaft 32 and are threaded into the crank 33. The crank 33 of the crank shaft is provided with radially spaced sets of dowel holes 107 and 108, while the cheek 91 is provided with sets of dowel holes 109 and 110 which are spaced radially the same as the dowel holes 107 and 108, respectively. The dowel holes 107 and 108 of the crank 33 are 10 degrees apart with respect to the axis $x$—$x$ of the crank shaft. The dowel holes 109 of the cheek 91 are also 10 degrees apart, and so are the dowel holes 110 of said cheek. However, the dowel holes 109 are angularly offset 5 degrees from their adjacent dowel holes 110. Thus, by inserting the dowel pins 111 in the holes 107 and 109 as shown in Fig. 6, the crank 33 may, for instance, be spaced from the crank 34 an angular distance of 170 degrees. This would give the pistons 27 a lead of 10 degrees over the sleeve valves 20.

If a lead of only 5 degrees is appropriate, the screws 105 are somewhat loosened and the dowel pins 111 removed from the holes 107, 109. Either part 101 or 102 of the crank shaft 32 is then slightly turned relative to the other part until the dowel holes 110a and 110b register with the dowel holes 108, whereupon the dowel pins 111 are inserted and the screws 105 re-tightened.

If a lead of 15 degrees should be desired, the dowel holes 110b and 110c are brought into registry with the dowel holes 108 and the dowel pins 111 inserted therein.

Thus, the preferred embodiment of this feature of the present invention as shown in Fig. 6 provides for three adjustments of the piston lead of 5 degrees each and within a range from 5 degrees to 15 degrees. Obviously, any other adjustable piston leads may be obtained as desired without departing from the present invention.

It is, of course, preferable to make the adjustment between the cheek 91 and the crank 33 rather than the crank 34, as the latter is smaller in diameter than crank 33 and might be unduly weakened by more than two dowel holes in addition to the tapped holes for the screws.

The reason for removably, though not angularly adjustably, securing the cheek 91 to the crank 34 rather than forming the same integral with said crank resides in the disclosure of six cylinders, which number requires an integral, rather than a divided, master rod which must be slipped over the crank 34 from the end. If the engine is to have less than six cylinders, say four cylinders, it is possible to use a divided master rod and to make the cheek 91 integral with the crank 34.

Driven in any suitable manner from the part 101 of the crank shaft may be the following non-disclosed devices, namely, the low pressure fuel pump, the oil pump, and a generator for light, signal and battery-charging purposes. Furthermore, the part 101 of the crank shaft may be drivingly connected with a conventional electric starter (not shown) for starting the engine.

In conclusion, the present engine has the following principal advantages besides others that are apparent from the preceding description.

The provision of sleeve type valves and their operation from the crank shaft results in an engine which has relatively few parts that can be easily assembled or interchanged. The cost of production of this engine is, therefore, comparatively low and its efficient operation depends on the proper operation of only a few parts. These advantages are even enhanced in an engine of the radial type in which all sleeve valves are operated from a single crank of the crank shaft.

The cylinders are readily accessible by merely removing the very simple cylinder heads which carry only the fuel nozzles. It is, therefore, a simple task to remove all carbon from the cylinders, and particularly from the pre-combustion chambers if they are provided in the heads as shown in the drawings.

The present engine is also in other respects readily accessible for inspection. The end cover 31 can, for instance, be removed to give access to the crank case, nor is it difficult to remove the supercharger and gain access to the operating mechanism for the fuel pumps. This is of particular advantage in airplane engines which have to undergo periodic inspection.

The provision of sleeve valves and the substantially tangential admittance of compressed air to the cylinder chambers as well as the substantially tangential discharge of the products of combustion therefrom results in a very effective straight-through scavenging of the cylinders.

The previously explained disposition of the communicating ducts 71 between the pre-combustion chambers 70 and the cylinder chambers 85 results in a quick and complete atomization of the injected fuel charge, particularly since the injected fuel is directed by said ducts so as to repulse the whirling combustion air in the cylinder chambers.

The angular adjustability of the cranks 33 and 34 of the crank shaft relative to each other renders the present engine adaptable for most efficient use under any atmospheric conditions and, hence, for any desired purpose, without requiring different crank shafts with differently offset cranks.

I claim:

1. In an internal combustion engine, the combination of a cylinder; a slidable valve for controlling the intake and exhaust; a piston in said cylinder; and a crankshaft consisting of two parts, one terminating in an eccentrically disposed crank and the other having a crank and terminating in a cheek disposed coaxially of the crank shaft, said cheek being angularly adjustably secured to the first mentioned crank, one of said cranks being drivingly connected with said piston, and the other with said valve.

2. In an internal combustion engine, the combination of a cylinder; a slidable valve for controlling the intake and exhaust; a piston in the cylinder; a crankshaft consisting of two parts, each terminating in an eccentrically disposed crank, and a separate cheek disposed coaxially of the crank shaft and removably secured to one of said cranks and angularly adjustably secured to the other crank; and a rod connecting said cranks with said piston and valve, respectively.

3. In an internal combustion engine, the combination of a plurality of radially disposed cylinders; a slidable valve in each cylinder for controlling the intake and exhaust; a piston in each cylinder; a crankshaft consisting of two parts, each terminating in a crank, and a separate cheek removably secured to one of said cranks, the other crank having a tapped hole and a plurality of dowel holes and said cheek having a slot concentric to the crankshaft axis and in alignment with said tapped hole and angularly spaced sets of dowel holes, each set of dowel holes being registerable with those of said other crank on rotation of one shaft part relative to the other shaft part, and a screw extending through said slot and being threaded in said tapped hole and pins in the registering dowel holes of said cheek and said other crank; and master rods with connecting rods drivingly connecting said cranks with said pistons and valves, respectively.

4. In an internal combustion engine, the combination of a cylinder; a slidable valve in the cylinder for controlling the intake and exhaust; a piston in the cylinder; a crank shaft consisting of two parts, one having a crank and terminating in a cheek and the other terminating in another crank, said other crank having a tapped hole and a plurality of dowel holes, and said cheek having a slot concentric to the crank shaft axis and in alinement with said tapped hole and angularly spaced sets of dowel holes, each set of dowel holes being registerable with those of said other crank on rotation of one shaft part relative to the other shaft part, and a screw extending through said slot and being threaded in said tapped hole and pins in the registering dowel holes of said cheek and said other crank; and rods connecting said cranks with said piston and valve, respectively.

JOHN J. McCARTHY.